July 11, 1933.  G. E. McCLOSKEY  1,917,384

APPARATUS AND PROCESS FOR CUTTING BACK PITCH

Filed July 31, 1929  3 Sheets-Sheet 1

INVENTOR
Gregory E. McCloskey
BY
Pennie Davis Marvin & Edmonds
ATTORNEYS

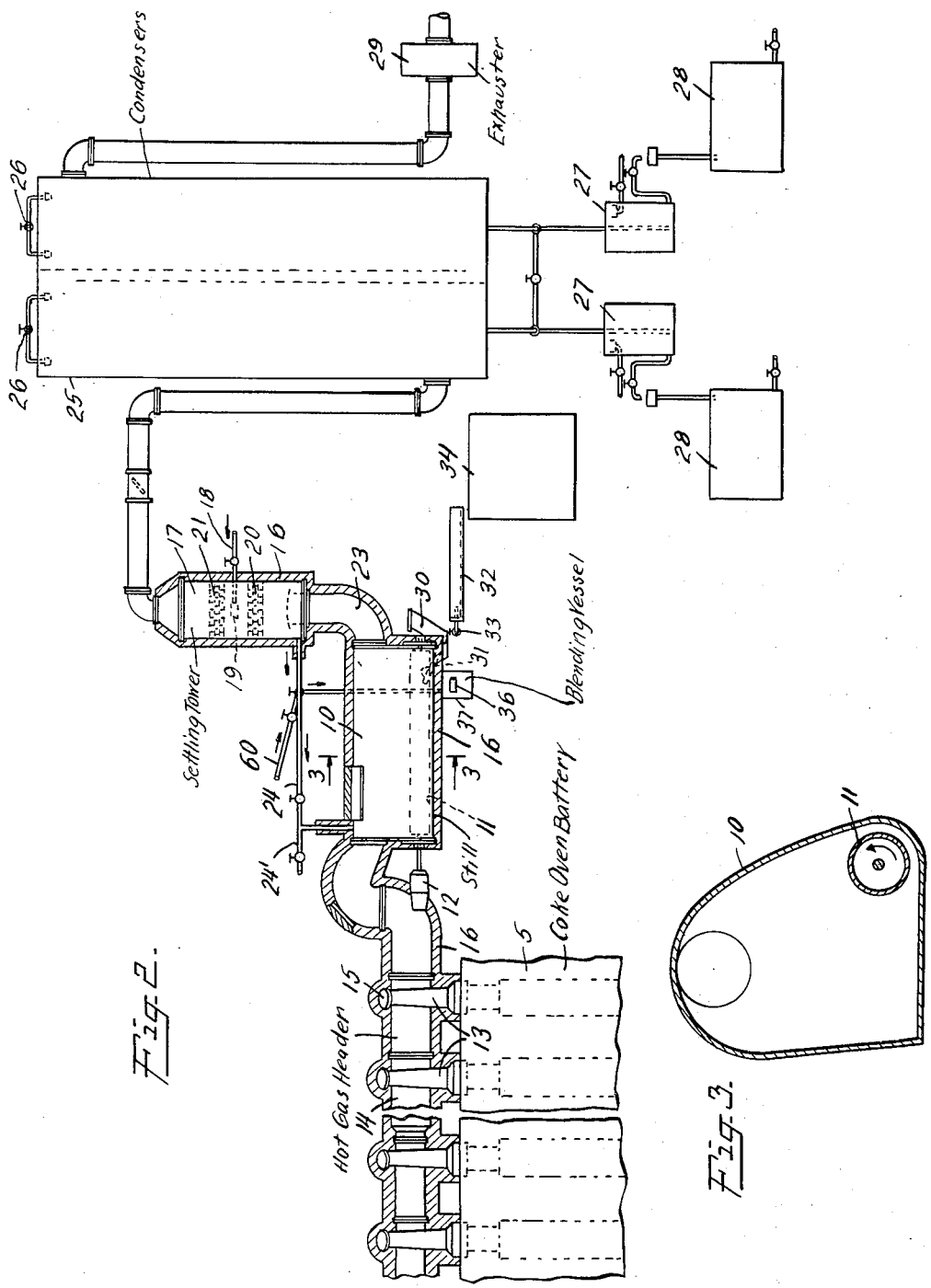

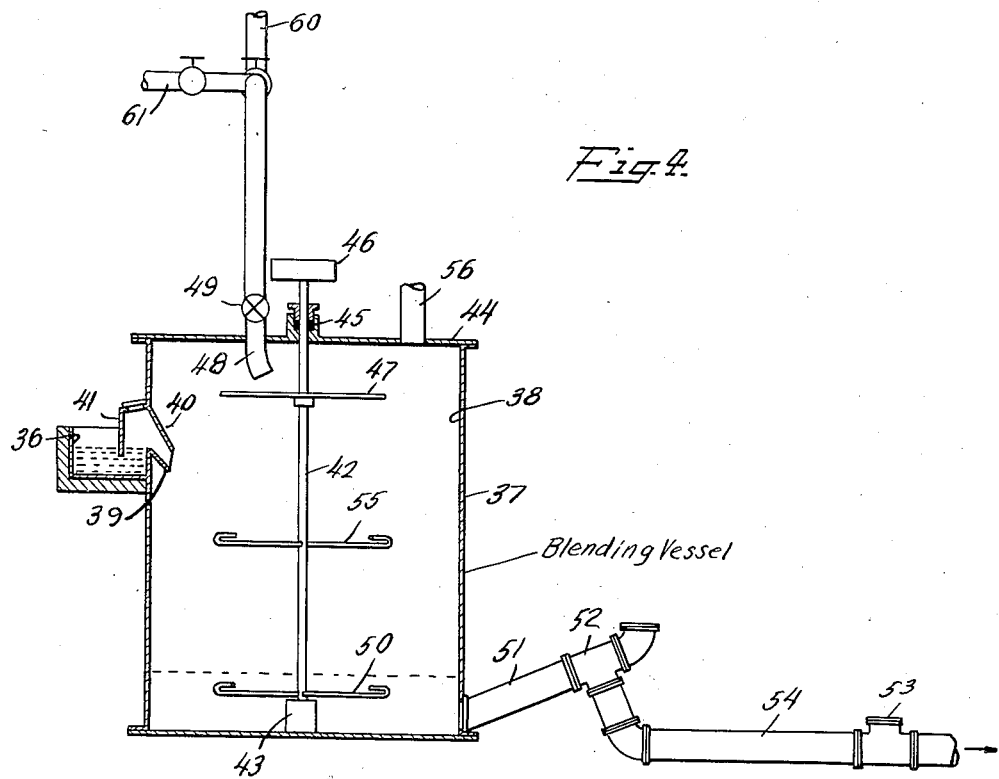
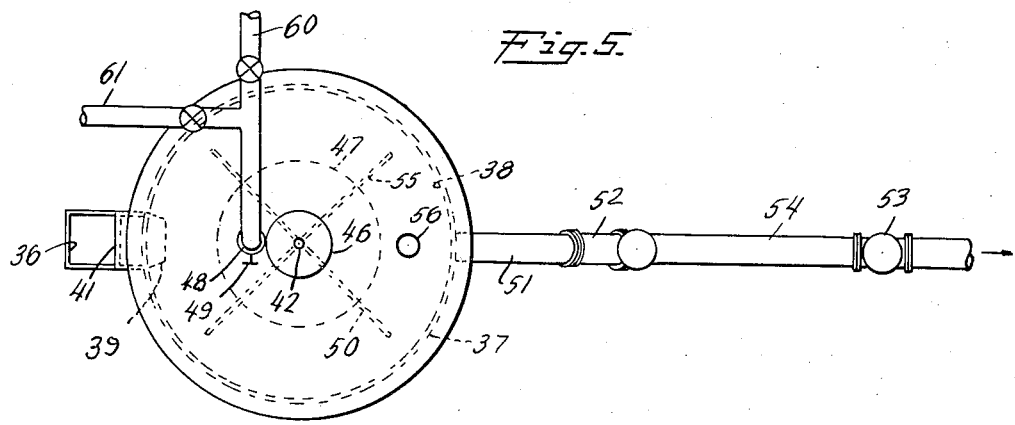

Patented July 11, 1933

1,917,384

UNITED STATES PATENT OFFICE

GREGORY EDWARD McCLOSKEY, OF SOUTH ORANGE, NEW JERSEY, ASSIGNOR TO THE BARRETT COMPANY, OF NEW YORK, N. Y., A CORPORATION OF NEW JERSEY

APPARATUS AND PROCESS FOR CUTTING BACK PITCH

Application filed July 31, 1929. Serial No. 382,375.

This invention relates to the mixing of hot thinly fluid pitches of high melting point and hydrocarbon fluxes of lower melting point, for example tars or semi-pitches, to form homogeneous mixtures herein referred to as "blended pitches". More particularly the invention relates to the production of blended pitches by mixing pitches of high melting point, e. g. 300° F. or 400° F. or higher, made by distilling tar by direct contact with hot coke oven gases, with a flux which is a semi-pitch prepared by stripping tar, preferably the same tar from which the high melting point pitch is prepared, to remove only its lower boiling constituents. The invention includes both the method and apparatus for carrying it out.

In blending a high melting point pitch or pitchy mixture while hot and fluid, herein referred to as a base, with a flux, which may be a tar or semi-pitch and which may be cold or heated somewhat, care must be taken to blend the hot base thoroughly with the flux before the base or any portion of it has cooled to a point where the base congeals and forms masses which will not readily blend further with the flux. If the base cools before being blended with the flux it may settle out from the flux as hard pitch, or it may form a gelatinous mass known in the art as "liver". When once the base has separated from the flux in either form, it is difficult and expensive to treat the mixture further to form a homogeneous blended mixture.

Processes which involve heating the flux to a high temperature to cause it to blend with the hot base involve high heat costs. Furthermore, heating the flux to a temperature at which satisfactory blending could be effected in an ordinary mixing tank is usually not practicable. Such high heat costs as well as other difficulties in blending may be eliminated according to this invention since the base may be blended with the flux while in its initial hot fluid condition in which it is formed, and the flux, if employed in small amounts, may be used cold. If the flux is to be used in large proportions it may be desirable to heat it somewhat. In any case, the flux need not be heated to the temperature required to blend it with a base of high melting point in an ordinary mixing tank. The apparatus is compact, cheap to build and easy to install.

According to this invention, the flux and the pitch are added to the blending vessel continuously. The walls of the vessel are preferably washed with a layer of the flux. The base is added to the vessel in such a manner that it does not come into contact with the fresh flux employed for washing the walls of the vessel but is brought into contact with a body of the blended material maintained within the vessel, and this blended material is sprayed or agitated to cause incorporation of the hot pitch without the formation of "liver" or hard pitch. The end-product is preferably withdrawn from the vessel in a continuous stream.

The pitch base is added to the vessel in such a way that it is not chilled by contact with the outside walls of the vessel and does not harden and build up a deposit of hard pitch base on the walls of the vessel. On the other hand, the incoming flux continuously washes down the walls, keeping them free from deposits of material of high melting point not yet uniformly mixed with the mass of blended material. The flux is thus gradually added to the mass of blended material in the form of a thin sheet which runs down the walls of the vessel and blends with the cut-back material within the vessel. The flux is added at the periphery of the mass of cut-back material and the base is added within the periphery of the mass of cut back material. Stirring or agitating means are provided within the vessel and foam breakers are also advantageously employed to break the foam caused by blending the hot pitch with flux, which may contain some moisture.

Vapors distilled from the flux during the blending operation may be drawn off from the vessel and condensed to form a separate distillate product, or the condensate may be returned to the blending vessel.

The base may be a high melting point pitch such as a pitch with a melting point of 300° F. or 400° F. or even higher. It may be a pitch formed by the distillation of tar with hot coke oven gases and the invention may advantageously be carried out in conjunction with such a distillation process to produce a blended product of desired properties, but the invention is not limited to that process alone.

The flux may be an oil, tar or a partially distilled tar, i. e. a semi-pitch. It may be heavy tar from the collector main of a coke oven plant or the hydraulic main of a retort plant, or a lighter tar such as the tarry oils from the condensers of such plants. It may be gashouse tar, water gas tar, etc. The flux may be a dehydrated tar or raw tar, i. e. tar containing a small percentage of water. A mixture of any of these materials may be employed as the flux.

The base is employed in a hot thinly fluid state, preferably as it comes from the still in which it is produced, although the base may be prepared for use by melting a pitch which has been allowed to harden. The flux may be preheated to a greater or less extent, although it may be blended cold. Where a large amount of flux is to be blended with a smaller amount of pitch, preheating of the flux may be desirable to allow incorporation of a larger amount of the flux with the pitch without causing the base to separate from the blended material.

Although the invention will be described in the drawings more particularly as applied in connection with the operation of a still in which tar is distilled by direct contact with hot coke oven gases, it is to be understood that the invention is not limited to blending a flux with a base from this source. The base may be pitch prepared by the distillation of tar by any of the methods well known to those skilled in the art.

In the drawings,

Fig. 2 is an elevation partly in section of the apparatus of Fig. 1;

Fig. 3 is a section through the still;

Fig. 4 is an enlarged view showing a cross-section through the blending vessel; and Fig. 5 is a plan view of the blending vessel.

Figure 1:
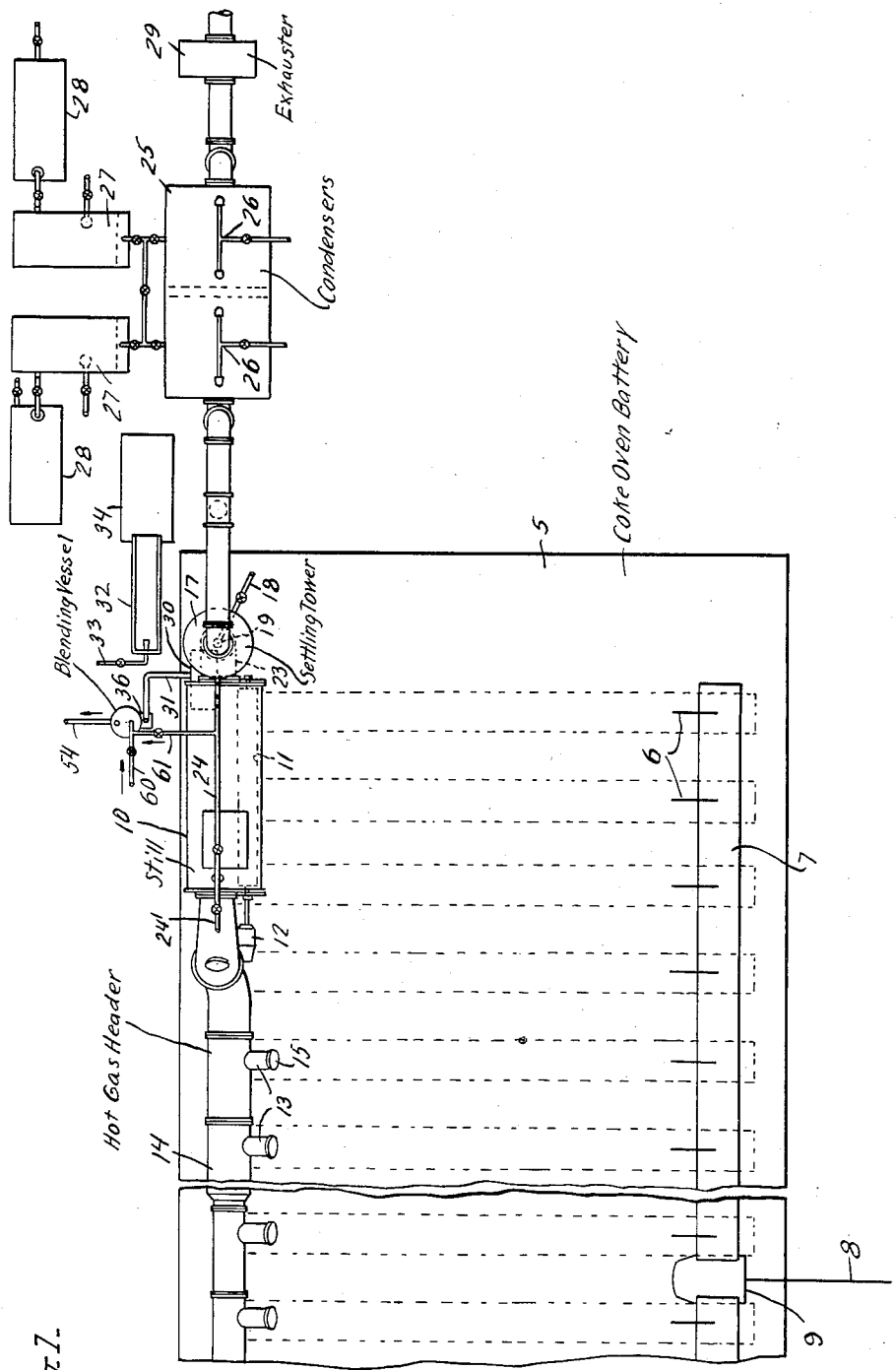
Fig. 1 is a plan view of a coke oven plant equipped with a still for the distillation of tar to produce a suitable base and showing the blending vessel of this invention for blending the base with a flux.

In the drawings, 5 indicates a coke-oven battery connected in the usual way through uptake pipes 6 with a collector main 7. The cross-over main 8 leads from the centerbox 9 of the collector main to condensers and means for the recovery of ammonia, etc. This apparatus may be of the usual type and is shown more or less diagrammatically in the drawings.

At the rear of the ovens is a still for the distillation of tar to produce the base employed for the blending operation of this invention. The tar may be coke oven tar, gashouse tar or other tar and it is distilled to a high melting point pitch, and the pitch is employed as the base for blending with a suitable flux.

In the drawings, the still 10 is equipped with a roll 11 connected with a motor 12 which is adapted to rotate the roll 11 at high speed, e. g. 900–1200 r. p. m., and thus produce a fine spray of tar within the still 10. Selected ovens of the battery are equipped with uptake pipes 13 at the opposite end of the ovens from the uptake pipes 6. These uptake pipes lead into the hot gas header 14. Valves 15 are provided in the uptake pipes 13 and by proper manipulation of these valves and valves of the usual type in the uptake pipes 6, the hot gases from these selected ovens may be passed either to the collector main 7 or through the hot gas header 14 into the still 10. The uptake pipes 13, the header 14, the still 10, and also the tower 17 are heavily insulated as indicated at 16.

A small body of the tar or low melting point pitch which is being distilled is kept within the bottom of the still. By rapid rotation of the roll 11, this tar or pitch is thrown up into the hot gases admitted from the header 14 and brought into direct contact with these hot gases in the form of an intense spray. The tar or pitch is distilled by the hot gases and the hot gases are substantially detarred. "Tar fog" comprising particles of coke, dust, pitch, etc., entrained in the gases leaving the ovens is removed from the gases by this fine spray of the material being distilled. The gases leaving the still are substantially de-tarred and on cooling yield clean oils.

The gases leave the still through the settling tower 17 where any small part of the spray which may be entrained in the gases is separated from the gases either by gravity or by the tar which is sprayed into the gases passing up through this tower. The tar to be distilled is admitted to the tower through the line 18 and the nozzle 19. A baffle 20 formed of Raschig rings is provided below the tar spray to expose a large surface of the incoming tar to contact with the hot gases to cause vaporization of lower boiling constituents of the tar, and also to wash out particles of the spray produced in the still 10, which may be carried from the still by the gases. Above the spray 19 another baffle 21 is shown for removing from the gases any particles of spray which may be carried up through the tower beyond the spray 19.

In order to produce a high melting point pitch it is desirable to pass the hot gases and the tar or pitch through the still in a concurrent direction so that the incoming tar or semi-pitch comes in contact with the hot gases and the partially distilled material or nearly formed final product is sprayed up into the gases which have been partially cooled by contact with the incoming tar and which have been partially saturated with oil vapors by distillation of this tar. This prevents over-distillation of the tar or pitch and the formation of coke within the still. The walls of the still are continuously washed with the hot, fluid charge to prevent the accumulation of pitch and the formation of coke on these walls.

In order to provide for concurrent flow of the gases and pitch through the still, the partially distilled tar or semi-pitch which collects in the bottom of the tower 17 is prevented from flowing down through the passage 23 through which the gases pass from the still into the tower, and it is drawn off through the line 24 and admitted to the still at the end of the still at which the hot gases enter through the hot gas header 14.

The hot cleaned gases enriched in oil vapors leaving the top of the tower 17 are cooled in any suitable manner to recover clean oil products. The condensers 25 are here shown for that purpose. These are direct condensers in which the gases are sprayed with ammonia liquor from the lines 26.

The condensate is collected together with ammonia liquor in one or more decanters 27. From these decanters the clean oil is separately collected in one or more tanks such as those shown at 28. Beyond the condensers an exhauster 29 and means for the recovery of ammonia and light oils, etc. from the gas is provided.

The pitch is withdrawn from the still 10 through the coke trap 30 in which any coke which may form in the still is separated from the pitch. The pitch is withdrawn from this coke trap through the levelling arm 31. By regulating the position of this levelling arm the depth of the tar or pitch in the bottom of the still is controlled and this automatically controls the nature of the spray thrown from the roll. The levelling arm may discharge into a trough 32 in which the hot pitch is instantly chilled by a stream of cold water from the line 33 which granulates the pitch. After being chilled in this manner the pitch may be collected in a storage bin 34.

When the pitch is to be employed in the blending operation of this invention, the levelling arm 31 is thrown over so that the pitch is discharged into the cup 36. This cup may be situated on the outside of the blending vessel 37 or the pitch may be piped from this cup to the blending vessel.

The blending vessel 37 is preferably a cylindrical vessel. The enclosing wall 38 may be a section cut from twelve inch pipe and may be some fifteen inches high, although the size of the vessel may vary depending upon the quantity of material to be handled. From the cup 36 the pitch is admitted into the body of the vessel in such a way that it does not come in contact with the containing wall of the vessel, and the pitch flowing into the vessel is advantageously protected by a baffle to prevent the incoming flux from being sprayed into the pitch as it enters the vessel. The spout 39 prevents the pitch from touching the wall 38 and hardening and building up on this wall and the baffle 40 shields incoming pitch from the spray of flux, described below. In order to prevent the escape of vapors through the pitch inlet, another baffle 41 is provided which dips into the pitch contained within the cup 36.

The shaft 42 resting in the bearing 43 is positioned vertically in the center of the blending vessel. It passes through the cover 44 of the vessel through a suitable stuffing box 45. A pulley 46 is provided to rotate this shaft 42 at high speed.

In the upper part of the vessel is the disc 47 which is fastened to the shaft 42 and rotates with it. The flux to be blended with the pitch is admitted to the vessel through the pipe 48. The flow of flux is controlled by the valve 49. The flux as it enters the chamber falls on to the disc 47 and because of the high speed of rotation of this disc the flux is thrown by centrifugal force out against the walls of the vessel and forms a continuous sheet of fresh flux on all of the walls, washing them and keeping them clean and preventing the accumulation on the walls of any material thrown up onto the walls from the mixing operation carried on within the vessel. The baffle 40 shields the pitch inlet and prevents the fresh flux from being brought into contact with the pitch before it enters the vessel.

The incoming flux washes down the walls of the vessel and blends with the pitch and a small body of the blended and blending material which is maintained within the vessel at all times. This body of material is agitated or stirred by suitable means such as the stirring arm 50 which is fastened to the shaft 42. More than one such stirring arm may be provided where desirable. The blended product is withdrawn through the draw-off 51. The amount of material retained in the vessel is determined by the position of the draw-off T 52. An opening 53 may be provided in the draw-off line 54 to serve as a sight-hole to observe the flow of blended material through this line.

The stirring arm 50 imparts a swirling motion to the body of material within the vessel. The flux is added at the periphery of this body of material, continuously, and in the form of a thin sheet. The incoming pitch falls within the periphery of the body of blended and blending material in the vessel and blends therewith. The flux, continuously added at the periphery of the body of blended and blending flux and base, rapidly blends therewith, as does the base, added within the periphery of this body of material. The material formed by this separate blending of the flux and base with the body of blended and blending material in the vessel is homogeneous.

If the flux contains moisture it is vaporized on blending with the hot base and may cause foaming. Any foam formed within the vessel is broken up by the foam breakers 55. Vapors escaping from the blending vessel may be passed off into the atmosphere through the vent 56, or they may be condensed and returned to the vessel or separately collected. The vent 56 may be connected with the still 10 so that vapors escaping from the vessel pass through the still and to the condensers 25.

The stirring arm 50 and the foam breakers 55 may be made from rods about ¼″ in diameter in a blending vessel 12″ in diameter and 15″ high. Two foam breakers positioned, for example, at 90° from one another and spaced several inches apart on the shaft may be employed where the conditions are such as to form an extraordinary amount of foam within the vessel. In preparing roofing pitch with a melting point of 140–145° F. (W. B.) by blending pitch with a melting point of about 400° F. (A. B.) from the still 10, with semi-pitch of a melting point of about 100° F. (W. B.) I have found that by rotating the shaft 42 at a rate of 400–450 R. P. M. adequate agitation of the contents of the vessel is provided, the flux is well distributed on the walls of the vessel and the formation of an excessive foam layer is prevented when only one foam breaker is employed.

In blending a high melting point pitch produced by the distillation of tar with hot coal distillation gases, the flux may be supplied to the blending vessel through the pipe 60 and the flux feed 48. Where a semi-pitch, i. e. a partially-distilled tar, is to be used and this is a semi-pitch produced from the same tar that the base is formed from, the operation may be so controlled that the semi-pitch is produced within the tower 17. The partially distilled tar drawn off from the bottom of the tower may entirely or in part flow through the line 24 into the still 10 and part may be drawn off through the line 61 and be admitted to the blending vessel as flux through 48. If all the semi-pitch formed in the tower 17 is used in the blending operation, tar from some other source is fed to the still 10 through pipe 24'. By drawing off semi-pitch from the tower directly into the blending vessel the semi-pitch is used in a hot or warm condition and the warm flux may be added to the hot pitch in relatively large amounts without difficulty.

The operation is not limited to the utilization of a flux produced in this distilling operation, but flux from another source may be admitted to the blending vessel through the line 60.

To produce a roofing pitch, as in the example given, the high melting point pitch is supplied directly from the still to the blending vessel. Tar, which may be ordinary coke oven tar, is admitted to the distilling apparatus through the line 18. It passes down through the tower over the baffle 20. It is partially distilled by the hot gases and vapors from the still. A portion of the semi-pitch thus produced enters the still proper through the line 24. The hot coke oven gases from the header 14 pass through the still and the tar, on being brought into intimate contact with these hot gases is distilled. The operation is so regulated that a pitch of 400° F. is produced. This pitch is drawn off continuously from the still through the coke trap into the cup 36 and admitted to the blending vessel through the spout 39. Semi-pitch also from the bottom of the tower enters the blending vessel through the lines 61 and 48. In starting the operation, the flux, i. e., the semi-pitch, is admitted gradually to the blending vessel, the amount being controlled by the valve 49. The agitator is set in motion. By observing the draw-off through the sight-hole 53, one can readily determine when a small stream of the flux is being drawn off at 54, i. e. when the blending vessel contains sufficient flux to function under operating conditions. The levelling arm 31 through which the pitch escapes from the still is then thrown from the position in which it discharges into the trough 32 to the position shown in the drawings, so that the pitch now enters the cup 36 and flows thence into the blending vessel. The pitch enters the vessel without touching the walls and is blended into the body of material maintained within the vessel. The flux, i. e. the semi-pitch, is sprayed on to the walls of the vessel, continuously washing them, and thus continuously blends with the body of material within the vessel. The amount of pitch and flux are so proportioned that the desired product is obtained. In producing roofing pitch, for example, 42.5–45 volumes of base may be blended with 57.5–55 volumes of flux, according to the method, and in the apparatus, here described. Vapors produced during the operation may be drawn off at 56 and conducted to the still 10 or to the tower 17, from whence they will pass to the condensers 25.

I claim:

1. The method of distilling tar to produce a high melting point pitch and blending the pitch with a flux, which comprises distilling tar to pitch with a melting point of at least 300° F. by bringing it into direct contact with hot gases, continuously adding the pitch while hot to a body of the blended product formed by the blending of pitch and flux, continuously adding flux to the body at a plurality of widely separated points without first bringing the flux into direct contact with the pitch, agitating the body and continuously withdrawing the blended product therefrom.

2. The method of producing blended pitch products from tar which comprises distilling the tar to semi-pitch, distilling a portion of the semi-pitch to pitch with a melting point of at least 300° F. by bringing it into direct and intimate contact with hot gases, and then blending the pitch with the balance of the semi-pitch by bringing the pitch in a hot thinly fluid condition direct from the still into contact with the semi-pitch with agitation to insure the formation of a homogeneous blended product.

3. The method of producing blended pitch products from tar at a coal distillation plant, which comprises distilling the tar to semi-pitch, distilling a portion of the semi-pitch to pitch with a melting point of at least 300° F. in a second distilling operation by bringing this semi-pitch into direct contact with hot coal distillation gases in the form of an intense spray, utilizing the hot gases and vapors from this distillation to distill the tar to semi-pitch, continuously blending the pitch while still hot and thinly fluid by blending it with the balance of the semi-pitch, and adding the semi-pitch to the pitch by spraying it onto the walls of the blending vessel while stirring the contents of the vessel and continuously drawing off the blended product.

4. In combination with means for distilling tar with hot gases in two stages, a still, a saturator, means for continuously passing hot gases thru the still and then thru the saturator, means for continuously introducing tar to the saturator, a blending vessel, means for drawing off a portion of the residue from the saturator to the blending vessel and for introducing the balance of the residue into the still, means for drawing off pitch from the still and introducing it into the blending vessel, agitating means in the vessel to blend the pitch and residue, and means for continuously removing the blended product from the blending vessel.

5. The method of producing blended pitch products from tar, which comprises distilling the tar to semi-pitch, distilling a portion of the semi-pitch to pitch with a high melting point and then blending the pitch of high melting point with the balance of the semi-pitch by bringing the pitch in a hot thinly fluid condition directly from the still into contact with the semi-pitch while agitating to insure the formation of a homogeneous blended product.

6. The method of producing blended pitch products from tar, which comprises passing fresh hot gases through two stills in series, bringing tar into contact with the gases in the second still, thereby vaporizing constituents of the tar, bringing a portion of the treated tar from this still into contact with the gases in the first still in the form of a fine intense spray, whereby the tar is further distilled and the gases are cooled, and blending at least a portion of the product resulting from the distillation in the second still with at least a part of the treated tar from the first still.

7. The method of producing blended pitch products, which comprises passing hot gases through two stills in series, bringing tar into contact with the gases in the second still so as to volatilize lower boiling constituents from the tar, distilling tar or pitch in the first still by spraying it into the gases in the form of a fine intense spray and blending pitch produced in the first still with treated tar from the second still.

8. Apparatus for producing blended pitch products, which comprises two stills, means for passing hot gases through the first still and then through the second still in series, means for introducing tar into the second still, means for withdrawing residue from the second still and dividing it and conveying part of the residue to the first still, a blending tank, means for conveying a part of the residue from the second still to the blending tank, means for conveying residue from the first still to the blending tank and means for producing a fine intense spray of tar or pitch in the gases in the first still.

In testimony whereof I affix my signature.
GREGORY EDWARD McCLOSKEY.